United States Patent
Arafat et al.

(10) Patent No.: US 10,510,450 B2
(45) Date of Patent: Dec. 17, 2019

(54) HEAT PIPE MOLTEN SALT FAST REACTOR WITH STAGNANT LIQUID CORE

(71) Applicant: WESTINGHOUSE ELECTRIC COMPANY, LLC, Cranberry Township, PA (US)

(72) Inventors: Yasir Arafat, Pittsburgh, PA (US); Jurie Van Wyk, Cranberry Township, PA (US); Edward J. Lahoda, Edgewood, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 175 days.

(21) Appl. No.: 15/701,477

(22) Filed: Sep. 12, 2017

(65) Prior Publication Data

US 2018/0075931 A1    Mar. 15, 2018

Related U.S. Application Data

(60) Provisional application No. 62/393,979, filed on Sep. 13, 2016.

(51) Int. Cl.
*G21C 17/10* (2006.01)
*G21C 7/10* (2006.01)
(Continued)

(52) U.S. Cl.
CPC .............. *G21C 7/10* (2013.01); *G21C 1/02* (2013.01); *G21C 9/02* (2013.01); *G21C 15/257* (2013.01); *G21C 3/54* (2013.01); *G21C 11/06* (2013.01)

(58) Field of Classification Search
CPC .......... G21C 7/10; G21C 15/257; G21C 1/02; G21C 1/03; G21C 9/02; G21C 9/027
(Continued)

(56) References Cited

U.S. PATENT DOCUMENTS

| | | | | |
|---|---|---|---|---|
| 2,787,538 A | * | 4/1957 | Spedding | G21C 19/48 75/399 |
| 3,042,599 A | * | 7/1962 | Biehl | G21C 1/14 376/212 |

(Continued)

FOREIGN PATENT DOCUMENTS

| | | |
|---|---|---|
| JP | H0943379 A | 2/1997 |
| WO | 2011/011504 A1 | 1/2011 |
| WO | 2016/109565 A2 | 7/2016 |

OTHER PUBLICATIONS

Eric H. Ottewitte; Cursory First Look at the Molten Chloride Fast Reactor as an Alternative to the Conventional BATR Concept; Article; Apr. 1992; http://egeneration.org/wp-content/Repository/Feasibility_and_concept_study/MCFR_BATR.pdf.

(Continued)

*Primary Examiner* — Jack W Keith
*Assistant Examiner* — Daniel Wasil
(74) *Attorney, Agent, or Firm* — Joseph C. Spadacene; Westinghouse Electric Company LLC

(57) ABSTRACT

A molten salt reactor includes a containment vessel, a reactor core, a neutron reflector spaced from the containment vessel, and liquid fuel enclosed within the core. The liquid fuel is comprised of a nuclear fission material dissolved in a molten salt. A heat exchanger is positioned external to the containment vessel. A plurality of heat transfer pipes are provided for transferring heat from the core to the heat exchanger. Each pipe has a first and a second end. The first end of each pipe is positioned within the reactor core for absorbing heat from the fuel. The heat exchanger receives the second end of each heat transfer pipe. At least two or more reactor shut down systems are provided. At least one (Continued)

shut down system may be a passive system and at least one or both shut down systems may be an active or a manually operated system.

16 Claims, 3 Drawing Sheets

(51) Int. Cl.
    *G21C 9/02*     (2006.01)
    *G21C 1/02*     (2006.01)
    *G21C 15/257*     (2006.01)
    *G21C 3/54*     (2006.01)
    *G21C 11/06*     (2006.01)

(58) Field of Classification Search
    USPC .................. 376/219, 280, 314, 367, 402
    See application file for complete search history.

(56) References Cited

U.S. PATENT DOCUMENTS

| | | | | |
|---|---|---|---|---|
| 3,338,840 A * | 8/1967 | Nelson | ............... | G21C 3/52 376/356 |
| 3,935,063 A * | 1/1976 | Dunckel | ............. | G21C 15/18 376/367 |
| 4,069,100 A * | 1/1978 | Cooper | ............. | G21C 13/10 376/314 |
| 4,322,853 A * | 3/1982 | Cawley | ............. | G21C 7/10 376/213 |
| 4,560,533 A * | 12/1985 | Huebotter | ............. | G21C 15/257 376/367 |
| 4,587,277 A * | 5/1986 | Sato | ............. | G21F 1/106 376/288 |
| 4,851,183 A | 7/1989 | Hampel | | |
| 8,625,732 B2 | 1/2014 | Singh | | |
| 2009/0080589 A1 * | 3/2009 | Sato | ............. | G21C 9/016 376/280 |
| 2010/0296620 A1 | 11/2010 | Peterson | | |
| 2011/0241144 A1 | 10/2011 | Spencer et al. | | |
| 2013/0272474 A1 * | 10/2013 | Conway | ............. | G21C 15/18 376/299 |
| 2014/0321596 A1 * | 10/2014 | Singh | ............. | G21C 15/18 376/298 |
| 2015/0036779 A1 | 2/2015 | Leblanc | | |
| 2015/0228363 A1 | 8/2015 | Dewan et al. | | |
| 2015/0357056 A1 | 12/2015 | Shayer | | |
| 2016/0027536 A1 | 1/2016 | McClure et al. | | |

OTHER PUBLICATIONS

D.E. Holcomb, et al.; Fast Spectrum Molten Salt Reactor Options; Article; Jul. 2011; Oak Ridge National Laboratory, Oak Ridge, TN 37831-6283; Managed by UT-Battelle, LLC for the U.S. Department of Energy Under Contract DE-AC05-00OR22725.

International Search Report and Written Opinion of the International Searching Authority dated Mar. 2, 2018 for PCT/US2017/051044 (Forms PCT/ISA/220, PCT/ISA/210, PCT/ISA/237).

* cited by examiner ure may be better understood by reference to the accompanying figures.
HEAT PIPE MOLTEN SALT FAST REACTOR WITH STAGNANT LIQUID CORE

BACKGROUND OF THE INVENTION

1. Field of the Invention

The present invention relates to nuclear reactors and more specifically to heat pipe cooled molten salt reactors.

2. Description of the Prior Art

Climate change is perceived to be one of the biggest threats to the world's economy in our time. Therefore, interest in developing clean energy technologies that can reduce reliance on fossil fuels has heightened. To that end, there is renewed interest in thoroughly reinvestigating and improving nuclear power, particularly as a power generator in markets that have heretofore been underserved by these technologies. Very small (less than 10 MW-thermal) nuclear generation devices have been developed, but have met with problems.

For example, Patent Application US2016/0027536 from Los Alamos National Labs describes a heat pipe portable reactor concept that has a solid stainless steel monolith core. Heat from the solid core is transported to the secondary side of the reactor via passive heat pipes. A heat pipe reactor has the advantage of not requiring an active pump. Although the design is very simple, there are some challenges. The solid monolith's fuel and heat pipe configuration result in a low-density nuclear fuel packing which may cause some neutron leakage and absorption of neutrons by the monolith, resulting in a lower neutron flux, necessitating a large amount of initial fuel loading to become critical.

Although heat pipes have high heat removal capability, they take up space in the core. Therefore, for a heat pipe reactor, any space not occupied by a heat pipe, should be occupied by fuel in order to attain highest fuel density. However, due to the solid state core and heat pipes, the interface between core and heat pipes may be problematic. While at steady state, the reactor would be expected to work without issues, but during transient events, the heat pipe and monolith may expand and contract at different rates and contribute to significant stresses in junctions and in the monolith itself opening the possibility of a heat pipe or monolith failure.

Furthermore, the core requires a relatively high enrichment, as much as 20%, to enable criticality due to the small size and neutron attenuation by the monolith. In addition, a large amount of fuel is needed to make the core critical and extend the life of the core. This leads to low fuel burn-up and poor fuel utilization.

Another type of reactor investigated from time to time for more than fifty years, is the molten salt fast reactor, wherein the fuel is dissolved in molten salt and actively pumped to the primary heat exchanger.

While traditional molten salt reactors have many advantages, such as simplicity and safety, there are inherent disadvantages and limitations. For example, molten salt fuel transfers heat poorly compared with sodium in a liquid metal fast breeder reactor and the high melting point (~560° C.) of suitable fuel salts necessitates preheating. The high melting point of the fuel salt limits the Δt across a heat exchanger. Consequently, the mass flow rate must be increased. In addition, the presence of fission products in the fuel salt necessitates a high standard of plant reliability and leak tightness, reducing the utility of molten salt reactors for widespread or remote deployment. See, Eric H. Ottewitte, "Cursory First Look at the Molten Chloride Fast Reactor as an Alternative to the Conventional BATR Concept," April 1992, (http://egeneration.org/wp-content/Repository/Feasibility_and_concept_study/MCFR BATR. pdf).

SUMMARY

The disadvantages with the prior reactors are addressed by the nuclear reactor described herein. In various embodiments, a reactor is provided for operative connection to a power conversion system or process heat system. In certain embodiments, the reactor may comprise a containment vessel, a reactor core housed within the containment vessel, a neutron reflector spaced from the containment vessel and positioned between the core and the containment vessel, a liquid fuel comprised of a nuclear fission material dissolved in a molten salt enclosed within the core, a plurality of heat transfer pipes, each pipe having a first and a second end, wherein the first end is positioned within the reactor core for absorbing heat from the fuel, a heat exchanger external to the containment vessel for receiving the second end of each heat transfer pipe for transferring heat from the core to the heat exchanger, and at least one reactor shut down system. In various aspects, there may be two shut down systems.

In various embodiments of the reactor, there may be at least three shutdown mechanisms: 1) one or more melting plugs which allow molten salt fuel to drain into a chamber, changing the critical mass and volume of the core, thus stopping the fission reaction; 2) a neutron absorber material, that may be in the form of neutron absorbing spheres, such as boron carbide spheres, that can fill a central cavity within the core by gravity triggered by deactivating a release member manually or automatically through a sensor signal, such as temperature sensor; and 3) rotating control members, in the form of drums or hollow rings or pipes, that include a neutron absorbing material portion and a neutron reflecting material portion.

In certain embodiments, the reactor may comprise very small (less than 10 MW-thermal) nuclear generation devices which, with the disclosed reactor design, provides a more reliable, sustainable, flexible, secure, resilient and/or affordable power generator than has heretofore been available.

BRIEF DESCRIPTION OF THE DRAWINGS

The characteristics and advantages of the present disclosure may be better understood by reference to the accompanying figures.

DESCRIPTION OF THE PREFERRED EMBODIMENTS

Figure 1:
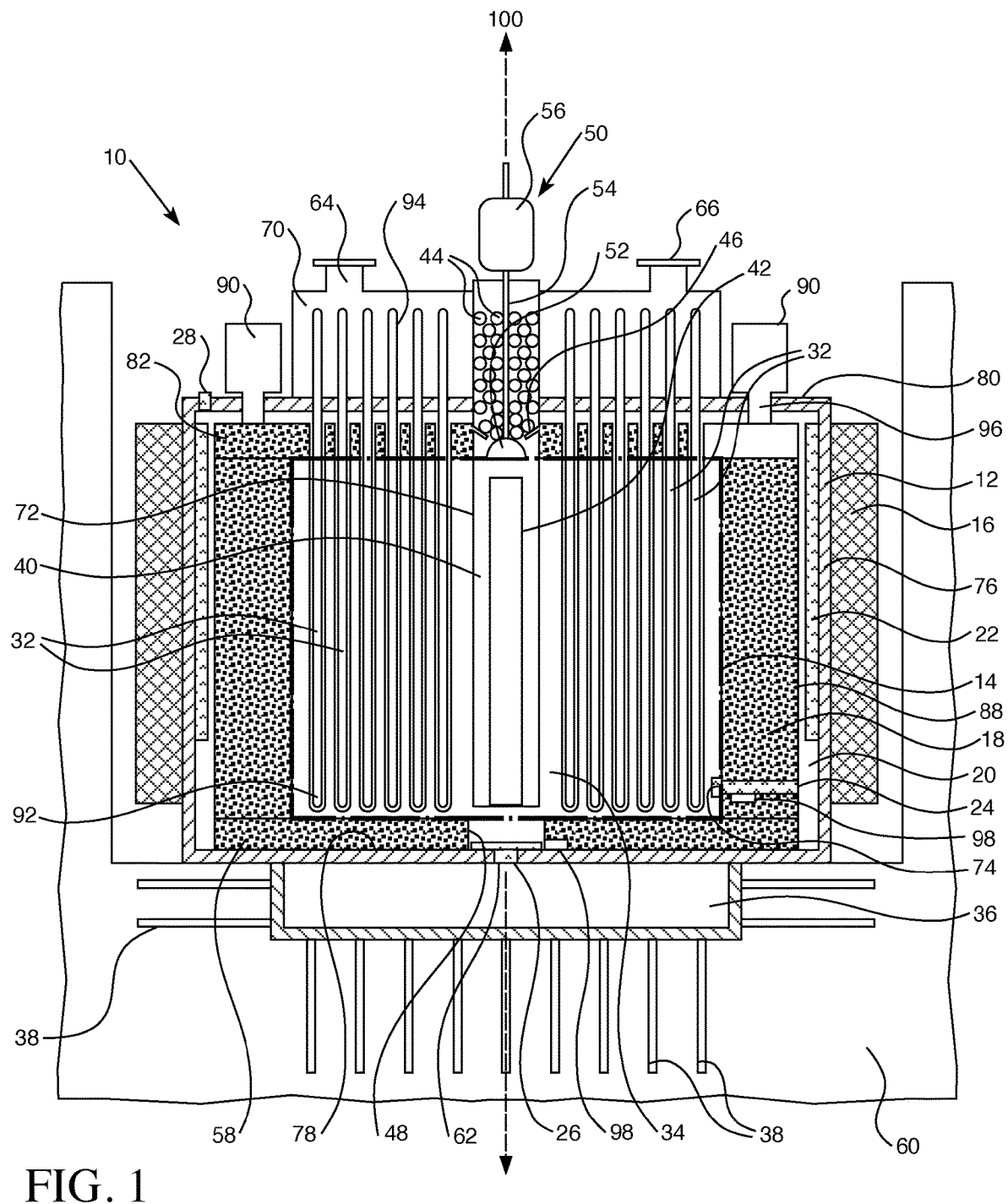
FIG. 1 is a section view of an embodiment of the heat pipe reactor core and housing described herein, showing one kind of a shut-down system in its deactivated mode, where the reactor is in a normal operating condition.

As used herein, the singular form of "a", "an", and "the" include the plural references unless the context clearly dictates otherwise. Thus, the articles "a" and "an" are used herein to refer to one or to more than one (i.e., to at least one)

of the grammatical object of the article. By way of example, "an element" means one element or more than one element.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

In the present application, including the claims, other than where otherwise indicated, all numbers expressing quantities, values or characteristics are to be understood as being modified in all instances by the term "about." Thus, numbers may be read as if preceded by the word "about" even though the term "about" may not expressly appear with the number. Accordingly, unless indicated to the contrary, any numerical parameters set forth in the following description may vary depending on the desired properties one seeks to obtain in the compositions and methods according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Further, any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

The reactor described herein comprises of an inherently load following, very small modular reactor that has a high degree of inherent safety, self-regulation, and security, with a passive heat transport system, passive decay heat removal and at least one shut-down system. The system is expected to have a long life, to require no planned maintenance, and is inherently proliferation resistant, which makes it ideal for use as an autonomous nuclear power generation system for remote or decentralized power needs.

In various embodiments, the reactor described herein is a molten halide salt reactor with a uranium halide (fluoride or chloride) or a uranium oxyhalide fuel dissolved in the molten salt, such as $UO_2Cl_2$ or $UO_4$ dissolved in any one or more of KCl, $MgCl_2$ and NaCl, with heat pipes to remove heat from the core to a secondary side of the reactor. Unlike previous molten salt reactor concepts where the fuel was pumped or moved to a primary heat exchanger, the liquid fuel in the reactor described herein is kept within the core container and heat pipes are used to carry only the heat from the liquid core to a secondary side of the reactor.

In various embodiments, the reactor is a molten salt fast reactor, wherein, as stated, the liquid fuel is kept within its container and is not pumped around unlike traditional molten salt reactors. This eliminates problems arising from the complexities associated with pumping around liquid fuel.

The various embodiments of the reactor described herein use heat pipes to transport only the heat from the core to a secondary fluid, for example, in a heat exchanger.

In various embodiments, the reactor may be a small, less than 20 thermal Megawatt (MWth), molten salt fast reactor. The fuel is dissolved in an alkali metal or alkaline-earth-metal halide salt such as a mixture of sodium chloride, potassium chloride, magnesium chloride, calcium chloride, and the like. Fluorides can also be used instead of chlorides. The fuel can be uranium chloride or uranium fluoride, uranium oxide, or uranium oxyhalides, with possible mixtures of thorium halides and transuranics.

In certain embodiments, the reactor is a thermal or epi-thermal reactor wherein moderators, such as graphite, are introduced in the core.

Referring to the Figures, an embodiment of a heat pipe molten salt fast reactor 10 (HP-MSFR) is shown. The reactor 10 is operatively coupled on a secondary side to a heat exchanger that is used to heat air or gas to drive a gas turbine or reciprocating machine or to generate steam for use in a steam turbine, either of which are used to drive an electric generator (not shown), similar to those of conventional water cooled reactors and prior forms of molten salt reactors. These features are well known to those skilled in the nuclear power generation industry and will not be described herein.

In various aspects, reactor 10 includes a containment vessel 12 having side walls 76, for example, in the form of a cylinder, a floor 78, and a ceiling 80. In various aspects, vessel 12 may be housed in a barrier housing 60 to provide a second containment function against leakage of fission material and to provide a secure barrier against external threats to the reactor core. The barrier housing 60 may be made of suitably thick and preferably reinforced concrete or a suitable structural metal that satisfies both desired functions. Barrier housing 60 may be placed for example, directly or indirectly in contact with the ground. The exterior of vessel 12 side walls 76 includes a plurality of cooling fins 16 that radiate outwardly from the vessel walls 76. A portion of the interior of sidewall 76 near ceiling 80 may optionally be lined with a fission gas adsorber 22.

Reactor containment vessel 12 may be made of a structural material to satisfy the containment function of the vessel. The material also may have good conducting properties. Exemplary materials include stainless steel and other good conducting structural alloys. Cooling fins 16 are preferably made of a good conducting material, such as stainless steel.

In certain embodiments, the reactor is a fast reactor having a thick neutron reflector 18 spaced from the interior of vessel 12 walls 76. The neutron reflector 18 may be annular in cross-section and have walls 88, a floor 58, and a ceiling 82. The neutron reflector 18 may be made of materials such as alumina oxide ($Al_2O_3$), beryllium oxide (BeO), or beryllium carbide ($Be_2C$).

The space between the walls 88 and ceiling 82 of the neutron reflector 18 and the walls 76 and ceiling 80 of the vessel 12 (whether or not lined with the absorber 22) defines a cavity 20. The core gas plenum or cavity 20 has dual function, both during normal operation and during shutdown. During normal operation the cavity 20 holds volatile fission product gases, which radiates significant thermal energy. The fission gases, such as helium, xenon, krypton, and radon, are generated by the nuclear fission reaction within the core 14. The volatile fission gases are poisonous for reactors, so to increase the useful life of the reactor, it is best to remove the gases. Exterior to the cavity 20 and vessel 12, are the cooling fins 16, which conduct heat away from vessel 12 to air and constantly cools the plenum. The plenum 20 may also include adsorber 22, which may be made from or include any suitable material that will adsorb fission gases, such as activated charcoal, zeolites or molecular sieves, to trap and retain fission gases to reduce vessel pressure. In the embodiments wherein the molecular sieves are cooled, cooling can be carried out passively via convective fins or by active air cooling. The fins can either be made out of conductive fins, such as stainless steel, copper, tungsten or heat pipe plates.

The vessel 12 of reactor 10 may also include an optional gas extraction port 28 from cavity 20 which can be used to periodically remove the volatile fission gases in a batch or continuous mode. If gas is released continuously, the fission gases can be sent through delay beds or directly sent out through the stacks.

Figure 3:
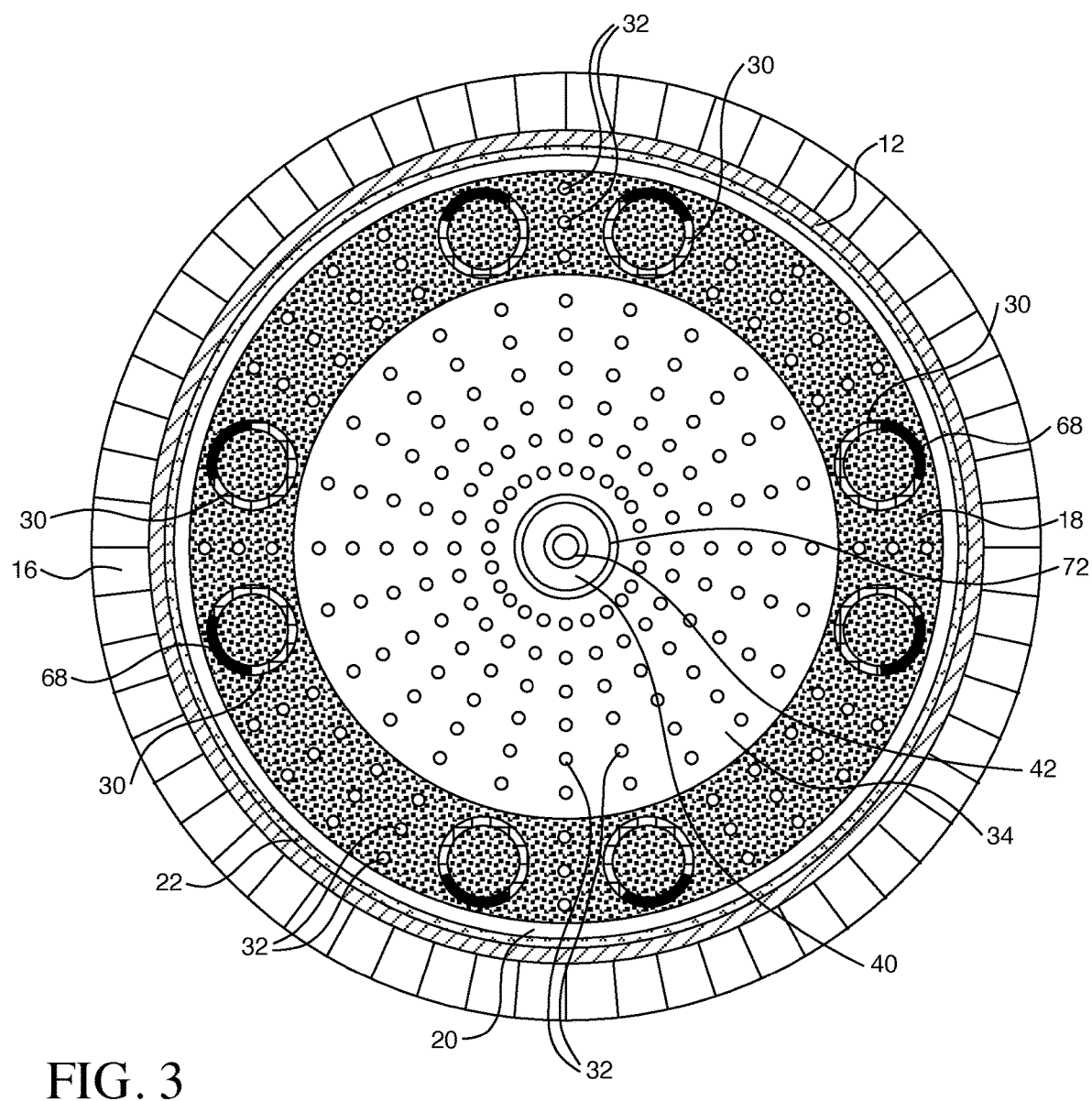
FIG. 3 is a cross-sectional view of FIG. 1 showing the reactor core enclosed within the housing.

Within the area defined by the neutron reflector 18 surfaces 88/58/82, lies the reactor core 14, designated by a dashed line in FIG. 1. The core 14 includes the molten salt fuel mixture 34 and heat pipes 32. Heat pipes 32 are preferably arranged evenly throughout the core and within the neutron reflector walls 88. The heat pipes 32 run parallel to the central axis 100 of reactor 10 and, in various embodiments, may be positioned along imaginary lines radiating from axis 100 in a spoke like configuration, as illustrated in FIG. 3.

Heat pipes 32 extend upwardly through neutron reflector 18 ceiling 82, plenum space 20 and vessel 12 ceiling 80 to carry the heat generated by fuel 34 in core 14 from the ends 92 of heat pipes 32 into a primary heat exchanger 70 positioned above vessel 12. The ends 94 of heat pipes 32 form the heat exchanger by transferring the heat from the core to a secondary fluid that passes by ends 94. A secondary fluid inlet port 64 and a secondary fluid outlet port 66 create a pathway through heat exchanger 70 for a secondary fluid to carry the heat to, for example, a turbine (not shown) or comparable equipment, to convert the heat energy into electricity by well-known means, or to transfer the heat to another location. The secondary fluid may be any fluid that can absorb and transfer heat.

Exemplary fluids include air and water or another fluid. A cold fluid, such as liquid water, cold air, or supercritical $CO_2$, enters the heat exchanger inlet port 64, flows past the upper portions 94 of heat pipes 32 where the heat in the heat pipes 32 flows from the higher potential to the lower potential secondary fluid, elevating the temperature of the secondary fluid, and exits the heat exchanger 70 through outlet port 66 as, for example, hot air or steam or a heated version of the chosen fluid, for transfer to the secondary side of the reactor 10.

In various embodiments, the heat pipes 32 are similar to those known in the art and may be constructed in the same way. The interior of heat pipes 32 may include, for example, a thin layer of a spongy material such as sintered stainless steel, wire mesh, or may be hollow tubes filled with a liquid to wick away the heat generated by the fission reaction of the fuel 34 in the core 14. The liquid may be sodium or potassium, or an alkali metal, such as lithium. In a fast reactor, the liquid in the heat pipes is selected from sodium and potassium and combinations thereof.

However, unlike a solid core reactor with heat pipes, the heat pipes 32 used in various embodiments of the reactor 10 described herein are always in "wetted" thermal contact with the liquid fuel. In various embodiments, the evaporator end 92 of each heat pipe 32 is "dipped" into the reactor coolant system, while the condenser end 94 is integrated in a primary heat exchanger 70. The heat pipes 32 may be alkali metal heat pipes, where one end 92 of the heat pipe 32 is submerged in the molten salt 34 of reactor 10.

The submerged end 92 of the heat pipes 32 and the interior of the reactor vessel 12 and any other structures that are in contact with molten salt can be made from corrosion resistant materials such as nickel or molybdenum steel alloys, ceramics, such as alumina or coated by a corrosion/erosion resistant material, such as high nickel steel, other metals or ceramics, such as alumina.

In various aspects, heat pipe 32 bundles can also be located above the reactor core 14 to induce natural convective flow in the molten salt. If one or more heat pipes 32 fail, the others can pick up the heat without considering its relative position to other heat pipes 32, thus significantly improving the safety of the reactor.

The reactor 10 preferably utilizes the molten salt fuel vessel geometry to place the fuel (in the molten salt) in an optimum shape such as a sphere that will reduce or minimize the neutron losses. This is particular important in small reactors where it is challenging to reach criticality due to the high neutron leakage. Although vessel 12 and core 14 are shown in the Figures as cylindrical in shape, other shapes may be used. However, the closer the shape is to being round, at least in the portions vulnerable to leakage, the more efficient the reactor is in preventing leakage. As stated, placing the fuel in a spherical shape is believed to be optimal. Appropriate changes to the structural elements (e.g., the containment vessel 12 and neutron reflector 18) of the reactor 10 from a cylinder as shown to spherical shapes may be made.

In various embodiments, the reactor 10 includes a reactor shut-down system. In various embodiments, the reactor 10 includes at least one, and preferably multiple reactor shut-down systems, that together act as redundant fail-safe systems in the event another shut-down system is for whatever reason inoperative or inadequate under a given scenario. The shut-down systems may be active or passive, and in various embodiments, at least one passive shut-down system may be employed. In various embodiments, at least one active shut-down system may be employed. Active mechanisms may be automatically triggered or manually triggered or have both options available.

In one embodiment of a shut-down system, one or more melt plugs may be used to change the geometry of the reactor core in the event of a failure to transfer heat from the core as designed. In certain aspects, an opening 48 may be cut in the neutron reflector floor 58 to expose a drain hole 62 in the vessel floor 78. The drain 62 leads to a drain chamber 36 under vessel 12 floor 78. Secondary heat dissipation elements or conductive fins 38 extend from chamber 36 into the barrier housing 60. The drain hole 62 is plugged during normal operation with a first melt plug 26. The melt plug 26 and drain 62 with chamber 36 act both to shut down the reactor and as a decay heat removal mechanism, transferring heat to the ground underneath the core. This feature shuts down the reactor and also forms a conductive bridge between the molten salt and the barrier material in housing 60 and/or ground, thus conducting decay heat to the ground. The fins 38 can be made out of either heat pipe plates or conductive materials, such as stainless steel, aluminum, copper, or tungsten.

A second melt plug 24 may be positioned to plug under normal operating conditions, a passage 74 in the neutron reflector wall 88 leading to cavity 20. In the event that the heat transfer pipes 32 do not function as designed or there is another cause for an increase in the temperature of the reactor core above a predetermined level deemed to be safe, thereby indicating failure conditions, one or both of the melt plugs 24/26 melt in response to the predetermined temperature rise, draining the molten salt fuel through drain 62 into the drain chamber 36 where the heat dissipation elements 38 dissipate the heat to cool the molten fuel, and/or through passage 74 into plenum 20, where cooling fins 16 on the exterior of vessel walls 76 passively cool the molten fuel by air or coolant circulation.

The melt plugs 24/26 may be made of any suitable material that melts only at the predetermined temperature deemed to be at the juncture between safe and unsafe operating conditions. For example, plugs 24/26 may be made of an aluminum alloy or stainless steel, or any alloy that will melt at, but not below, the predetermined critical temperature. For example, if the critical temperature at which conditions may be deemed to be unsafe is above 700° C. then an aluminum alloy that melts at, for example, 650 or 660° C. to sufficiently less than 700° C. for effective safety, would be used.

By opening drain 62 and/or passage 74, the core geometry, which is important to the optimum functioning of a reactor, is altered, thus shutting down the reactor when coolant temperature rises beyond normal operating range.

Figure 2:
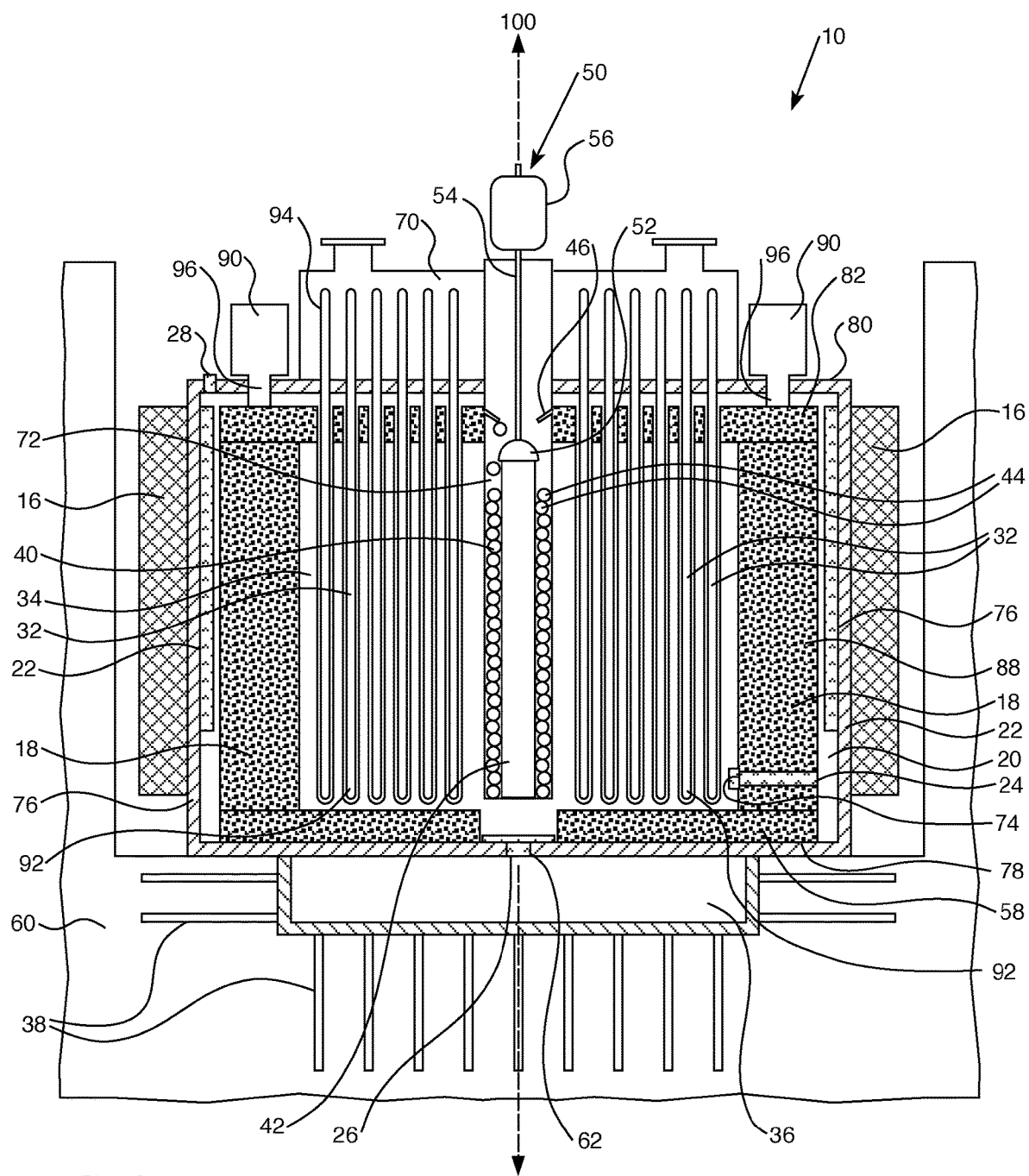
FIG. 2 is a section view of the reactor of FIG. 1 showing the shut-down system after activation, where the absorber material drops into the reactor core to absorb neutrons to shut down the reactor.

Another embodiment of a hybrid active and passive safety shutdown system is shown in inactivated and activated states in FIGS. 1 and 2, respectively. This embodiment of the reactor shutdown system can be activated by both passive activation or active activation features. Upon activation, a neutron absorbing material, such as a boron carbide material, may be inserted into the open cavity 40 of a hollow tube 72 in the center or outside of the core 14 volume that is not filled with the molten salt. Until activation, the absorbing material is held away from the core 14.

Referring to FIG. 1, a tube 72 defining an absorbing cavity 40 runs through the center of core 14 coaxial to the center axis 100 of reactor 10. The tube 72 and cavity 40 extend through the neutron reflector ceiling 82, vessel ceiling 80 and into the primary heat exchanger 70. A holding gate 46 and ramped or sloped member 52 are inside the tube 72. The member 52 is suspended in absorbing cavity 40 by an actuation rod 54, which in turn extends downwardly into cavity 40 from a control rod drive or release mechanism member 56, positioned above and outside of the heat exchanger 70. In various embodiments, the tube 72 may further include a guide tube 42 positioned within cavity 40 beneath ramped member 52.

Referring to FIG. 1, illustrative of the absorbing material shut-down system in the deactivated state, the neutron absorber material, for example, neutron absorber spheres 44, are held in the upper portion of cavity 40 by holding gate 46. In this position, the absorber spheres 44 are positioned outside of the core 14. Suitable dual active-passive activation mechanisms may be used.

FIG. 2 shows the absorbing material shut-down system in the activated state wherein the holding gate 46 has opened, ramped member 52 and rod 54 have been lowered so that ramped member 52 rests on top of guide tube 42. When activated, control rod release member 56 releases rod 54 so that it lowers ramped member 52, thereby opening holding gate 46 and releasing absorber spheres 44 into the lower portion of cavity 40 within core 14 between the walls of tube 72 and guide tube 42. Guide tube 42 directs the spheres 44 towards the wall of tube 72 to be in close proximity to core 14. The absorbing material absorbs the neutrons from fuel mixture 34 which shuts down the fission reaction. The holding gate 46 is kept closed by the release member 56, which may be for example, an electromagnetic device that is structured to release the ramped member 52. Upon activation, the electromagnetic upwardly pulling force can be deactivated by breaking the electricity supply to the electromagnetic device. The electricity supply can be broken by manual or automatic activation through a signal, for example, when a pre-determined set point temperature below, for example, the melting point of the melt plugs 24/26, is exceeded. Upon release, the rod 54 falls into the open activated position by gravity to allow the release of the absorber spheres 44.

Referring to FIG. 3, a plurality of rotatable member 30 positioned within neutron reflector walls 88 provide another embodiment of a shut-down system. Rotatable members 30 may be in the form of drums, rings or pipes that extend the length of the neutron reflector material. A portion or segment 68 of each rotatable member 30, shown in FIG. 3 as arcuate segments 68, includes an absorber material made, for example, of boron carbide, $B_4C$. Rotatable members 30 are operatively connected to rotating drive mechanism 90 through actuation rods 96 to actuate rotation of rotatable members 30. The rotatable members 30 can be used to control the fission reaction. If the rotatable members 30 are rotated so that the absorber material on segments 68 face core 14, neutrons from the fuel 34 in core 14 will be absorbed into the boron carbide absorbing material, causing the reactor to reach subcritical neutron levels, and the reaction will stop.

Referring to FIGS. 1 and 2, another embodiment of a shut-down system can be provided by adding a heating element 98 proximate to one or both of drain 62 and passage 74. The heating element may be positioned in the drain 62 or passage 74 or sufficiently close to heat the melting plug 24 and/or 26. The heating element 98 can be actuated by supplying an electric current through the heating element 98 that melts the melting plug 24/26 upon actuation. Electric current may be supplied by a heating element controller electrically connected to the heating element 98 for manual activation of the heating element 98. By opening drain 62 and/or passage 74, the fuel will flow out and the core geometry, which is important to the optimum functioning of a reactor, will be altered, thus shutting down the reactor.

When the reactor 10 is initially loaded with the molten salt fuel mixture 34, the segments 68 of absorber material face reactor core 14. When the reactor 10 is activated or turned on, the rotatable members 30 are gradually rotated to move the segments 68 with the absorbing material away from the core 14. When the reactor reaches the desired power level, the rotation of rotatable members 30 is stopped. As the fuel is used up, rotatable members 30 in the position shown in FIG. 3 reflect more neutrons back towards core 14. When there is a build-up of fission products, the fission reaction stops and the reactor shuts down.

In various embodiments, a gamma shield may be positioned outside of the reactor 10 as an extra precautionary measure and protective shield for people in the vicinity of the reactor 10. Alternatively, or in addition, the reactor 10 may have a double walled containment vessel 12.

Molten salt is corrosive in nature. In a traditional molten salt reactor, all reactor vessels, fuel rods, pipes, primary heat exchangers, valves, pump impeller and other components had to be lined with corrosion/erosion-proof material. In the reactor described herein, only the heat pipes 32 and the internal wall 76 of the vessel 12 have to be made of or lined with corrosion resistant material. If the neutron reflector 18 is made of alumina, it can also act as an inner wall to the vessel 12, as shown in FIG. 1. Liquid fuel dissolved in molten salts has a very strong temperature reactivity feedback coefficient so the core 14 is self-regulating. This eliminates the need for active reactor controls. However, as shown in FIG. 3, the rotatable members 30, with absorber 68 in a crescent or arcuate form, may be used to control reactivity and temperature set point during normal operation. The control rotatable members 30 are mainly used as an active shutdown system. In addition to the rotatable members 30, an additional shutdown systems may be provided.

In fast reactor embodiments, a neutron reflector 18 is positioned around the fuel mixture 34. Additional heat pipes 32 can be embedded in the neutron reflector wall 88 for preheating the secondary fluid before removing heat from the core 14. Volatile fission gases will evolve out of the liquid fuel mixture 34 and start collecting in the plenum 20 above the core 14. The plenum 20 is extended to a region outside the neutron reflector 18 to accommodate more volatile fission gases. A gas adsorber 22 may be used to reduce pressure of the vessel 12. Due to high activity of the fission gases, the adsorber needs to be constantly cooled. The gas adsorber 22 is attached to the inner layer of the reactor vessel 12. On the exterior of the reactor vessel there are finned channels 16. Natural convection of air through these channels 16 in the space between the vessel 12 and barrier housing 60 can constantly cool the reactor 10 down during normal operation.

During off normal scenarios, if by any chance, the reactor core 14 becomes over-heated the passive shutdown mechanisms or the fuel negative feedback kick in. There may, for example, be any one of, or a combination of, the following three shutdown mechanisms: 1) one or more melting plugs 24/26 which allow molten salt fuel to drain into one or both of a chamber 36 and the cavity 20 surrounding the core 14, changing the critical mass and volume of the core 14, thus stopping the fission reaction; 2) a neutron absorber material, that may be in the form of neutron absorbing spheres 44, such as boron carbide spheres, that can fill a central cavity 40 within the core 14 by gravity triggered either by activating the release member 56 manually or automatically through a sensor signal; and 3) rotatable members that include a neutron absorbing material portion and a neutron reflecting material portion.

The reactor 10 in various embodiments may include two independent decay heat removal systems. In one, a first melting plug 26 melts to open the core 14 to a drain chamber 36 to conduct much of the heat via conducting fins 38 or heat pipes 32 into the concrete or structural material of barrier housing 60 and eventually to the ground, once it is filled with molten salt fuel. A second melting plug 24 allows the bottom of the outer fission gas cavity 20 to be filled with molten salt and fuel thus allowing the decay heat removal by air utilizing the fins 16 outside the reactor vessel 12.

The reactor 10 is designed to accommodate the liquid state of the already molten fuel so there is no risk of a fuel meltdown as is present where solid fuel can potentially melt down at high temperatures in certain severe accident scenarios. The reactor vessel 12 is preferably made with neutron reflector material such as alumina, which has a very high melting point of 2072° C., and has very little chance of failure due to temperature. Before the vessel 12 can be damaged by overheating, the melting plugs 24/26 will allow safe reactor shutdown.

The reactor 10 described herein provides layers of inherent and passive safety by elegantly integrating multiple functions, without complicating the system.

Nuclear micro-reactors can generate reliable, safe, emissions-free energy for heat and electricity production in decentralized locations. Various embodiments of the reactor described herein are expected to satisfy the desire for reliability, resiliency, efficiency, sustainability and security. The nuclear micro-reactor described herein can achieve all or any combination of these goals in most market applications. Decentralized generation of emissions free energy may supplement or even surpass centralized power generation capacity, thereby increasing distribution and availability of clean, reliable power at a significant cost savings.

The reactor 10 is inherently safe. The reactor 10 has several key advantages. Compared to a solid monolith reactor, a heat pipe molten salt fast reactor (HP-MSFR) has a much more profound and prompt negative temperature feedback coefficient due to expansion and Doppler Effect. Under any normal or off-normal transient conditions, the reactor 10 is designed to self-regulate to ensure reactor safety.

Since it is a fast reactor and the fuel is in liquid form, a change in reactor geometry can shut down the reactor. If the heat pipes 32 become ineffective in carrying away the heat generated from the core 14, the temperature in the core 14 rises. However, in certain embodiments, before the temperature can rise above a critical temperature determined to be unsafe, a very reliable passive shutdown system is triggered by the use of one or both melting plugs 24/26. The liquid fuel can drain to into cavity 20 or to chamber 36 which can also remove decay heat to the ground very effectively.

Another advantage of the reactor 10 is its reduced fuel cost. Since the fuel is molten, there is no need for a fuel fabrication plant, which can be a significant upfront cost savings. Molten salt reactors, due to their high power density, can have a small core without the need of very high enrichment. This can significantly reduce licensing challenges and infrastructure needs.

Molten salt reactors can burn any fuel ranging from uranium, thorium or transuranic from used fuel. The reactor 10 can potentially play a vital role in the deployment of a closed fuel cycle and reduce long lived waste. Due to the high power density of the core, one can design and build a very small HP-MSFR for small, decentralized power generation for both heat and electricity generation.

Due to its overall simplicity and need of very little fuel, various embodiments of the reactor described herein are expected to be economically competitive, not only in price, but in the potential for off-grid decentralized power generation applications.

The molten fuel neutronic behavior characteristic and inherent heat pipe behavior enhance the inherent control capability required for autonomous operation.

The present invention has been described in accordance with several examples, which are intended to be illustrative in all aspects rather than restrictive. Thus, the present invention is capable of many variations in detailed implementation, which may be derived from the description contained herein by a person of ordinary skill in the art.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative embodiments. The embodiments described herein are understood as providing illustrative features of varying detail of various embodiments of the disclosed invention; and therefore, unless otherwise specified, it is to be understood that, to the extent possible, one or more features, elements, components, constituents, ingredients, structures, modules, and/or aspects of the disclosed embodiments may be combined, separated, interchanged, and/or rearranged with or relative to one or more other features, elements, components, constituents, ingredients, structures, modules, and/or aspects of the disclosed embodiments without departing from the scope of the disclosed invention. Accordingly, it will be recognized by persons having ordinary skill in the art that various substitutions, modifications or combinations of any of the exemplary embodiments may be made without departing from the scope of the invention. In addition, persons skilled in the art will recognize, or be able to ascertain using no more than routine experimentation, many equivalents to the various embodiments of the invention described herein upon review of this specification. Thus, the invention is not limited by the description of the various embodiments, but rather by the claims.

What is claimed is:

1. A nuclear reactor for operative connection to a power conversion system, the reactor comprising:
   a containment vessel;
   a reactor core housed within the containment vessel;
   a neutron reflector spaced from the containment vessel and positioned between the core and the containment vessel;
   a liquid fuel comprised of a nuclear fission material dissolved in a molten salt enclosed within the core;
   a plurality of heat transfer pipes, each pipe having a first end and a second end, the first end being positioned within the reactor core for absorbing heat from the fuel;
   a heat exchanger external to the containment vessel, the heat exchanger receiving the second end of each heat transfer pipe for transferring heat from the core to the heat exchanger; and
   at least two reactor shut down systems that together act as redundant fail-safe systems comprising a first shut down system and, at least one second shut down system, wherein the first shut down system comprises:
   a rotatable member mechanism comprising:
      a plurality of rotatable members positioned within the neutron reflector and having a neutron absorber section and a non-absorber section; and,
      a rotating drive mechanism operatively connected by activation rods to each rotatable member for rotating the rotatable member to move the neutron absorber section to one of a first position facing the core and a second position facing away from the core, and
   the second shut down system comprises one or both of a neutron absorber activation system and a melt-plug mechanism.

2. The nuclear reactor recited in claim 1 wherein the second shut down system is the melt-plug mechanism and comprises:
   an opening in the containment vessel;
   a chamber fluidly connected to the opening in the containment vessel;
   a melt plug to plug the opening in the containment vessel;
   the melt plug being made of a material that melts at a predetermined temperature deemed to be indicative of unsafe temperature conditions within the reactor core.

3. The nuclear reactor recited in claim 2 wherein the melt plug is made of an alloy and the predetermined temperature is between 650° C.–900° C.

4. The nuclear reactor recited in claim 2 further comprising:
   a barrier housing for holding the containment vessel; and
   a plurality of heat dissipation elements extending from the chamber into the barrier housing.

5. The nuclear reactor recited in claim 1 further comprising:
   a central axis extending through the core;
   wherein the second shut down system comprises the neutron absorber activation system comprising:
   a hollow tube defining a cavity and being positioned coaxially to the central axis and extending from an area above the core into the core;
   a gate separating a first portion of the hollow tube above the core from a second portion of the hollow tube within the core;
   a neutron absorber material housed in an unactivated position within the first portion of the hollow tube;
   an activation rod operatively connected to the gate;
   a release member for releasing the actuation rod from the unactivated position to move to an activated position, wherein in the activated position, the actuation rod opens the gate to release the neutron absorber material into the cavity within the second portion of the hollow tube in proximity to the fuel to absorb neutrons from the fuel sufficient to shut down the reactor.

6. The nuclear reactor recited in claim 5 wherein neutron absorber shut down system further comprises:
   a guide positioned within the hollow tube coaxial to the central axis and defining a channel between the hollow tube and the guide for receiving the neutron absorber material upon release thereof in the activated position.

7. The nuclear reactor recited in claim 1 further comprising:
   a barrier housing for holding the containment vessel.

8. The nuclear reactor recited in claim 1 wherein at least one of the first and at least one second shut down systems is a passive system and at least one is an active system.

9. The nuclear reactor recited in claim 1, wherein the containment vessel has an interior and an exterior, further comprising:
   a plurality of cooling fins on the exterior of the containment vessel.

10. The nuclear reactor recited in claim 1, wherein the containment vessel has an interior and an exterior, further comprising:
   a lining on the interior of the containment vessel comprised of a fission gas absorbing material.

11. The nuclear reactor recited in claim 1 wherein the fuel comprises one or both of a uranium halide or a uranium oxyhalide, dissolved in one or more of a potassium, magnesium, or sodium salt.

12. The nuclear reactor recited in claim 1 wherein the containmnent vessel is in the shape of a cylinder.

13. A nuclear reactor for operative connection to a power conversion system, the reactor comprising:
   a containment vessel;
   a reactor core housed within the containment vessel;
   a neutron reflector spaced froze the containment vessel and positioned between the core and the containment vessel;
   a livid fuel comprised of a nuclear fission material dissolved in a molten salt enclosed within the core;
   a plurality of heat transfer pipes, each pipe having a first end and a second end, the first end being positioned within the reactor core for absorbing heat from the fuel;
   a heat exchanger external to the containment vessel, the heat exchanger receiving the second end of each heat transfer pipe for transferring heat from the core to the heat exchanger; and at least three reactor shut down systems comprising a first shut down system, a second shut down system, and a third shut down system, the first shut down system comprising:
a rotatable member mechanism comprising:
  a plurality of rotatable members positioned evenly within the neutron reflector, each rotatable member having a neutron absorber section and a non-absorber section; and,
  a rotating drive mechanism operatively connected to each rotatable member for rotating the rotatable member to move the neutron absorber section to one of a first position facing the core and a second position facing away from the core;
the second shut down s stem comprising:
a melt-plug mechanism comprising:
  an opening in the containment vessel;
  a chamber fluidly connected to the opening in the containment vessel;
  a first melt plug, to plug the opening in the containment vessel;
  the first melt plug being made of a material that melts at a predetermined melting temperature deemed to be indicative of unsafe temperature conditions within the reactor core; and the third shut down system comprising:
a central axis extending through the core and a neutron absorber activation system comprising
a hollow tube defining a cavity and being positioned coaxially to the central axis and extending from an area above the core into the core;
a gate separating a first portion of the hollow tube above the core from a second portion of the hollow tube within the core;
a neutron absorber material housed in an unactivated position within the first portion of the hollow tube;
an activation rod operatively connected to the gate;
a release member for releasing the actuation rod from the unactivated position to move to an activated position, wherein in the activated position, the actuation rod opens the gate to release the neutron absorber material into the cavity within the second portion of the hollow tube in proximity to the fuel to absorb neutrons from the fuel sufficient to shut down the reactor.

14. The nuclear reactor recited in claim 13 further comprising:
a passage through the neutron reflector from the reactor core to a space defined between the containment vessel and the neutron reflector;
a second melt plug to plug the passage;
the second melt plug being made of a material that melts at a predetermined melting temperature deemed to be indicative of unsafe temperature conditions within the reactor core.

15. The nuclear reactor recited in claim 14 further comprising:
a heating element positioned proximate to at least one of the opening in the containment vessel for heating the first melt plug, to the predetermined melting temperature of the first melt plug and the passage for heating the second melt plug to the predetermined melting temperature of the second melt plug, and
a heating element controller electrically connected to the heating element for manual activation of the heating element.

16. The nuclear reactor recited in claim 13 wherein the neutron absorber shutdown system further comprises:
a guide positioned within the hollow tube coaxial to the central axis and defining a channel between the hollow tube and the guide for receiving the neutron absorber material upon release thereof in the activated position.

* * * * *